No. 878,354. PATENTED FEB. 4, 1908.
R. CONNELL.
TIRE SETTING TOOL.
APPLICATION FILED JULY 21, 1906.
2 SHEETS—SHEET 2.
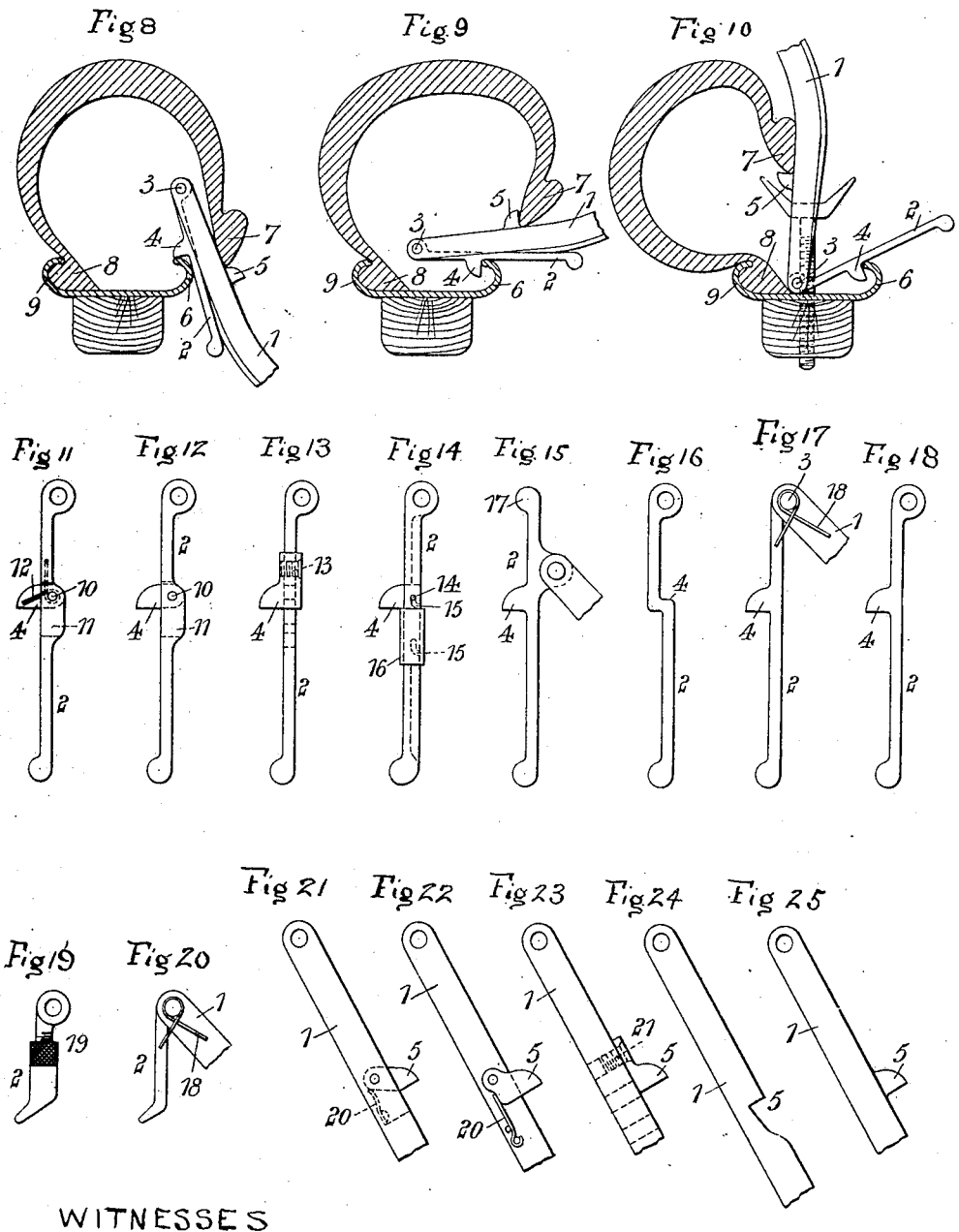
WITNESSES
L. H. Grote
M. E. Kiir
INVENTOR
ROBERT CONNELL
By Howson and Howson
Attorneys

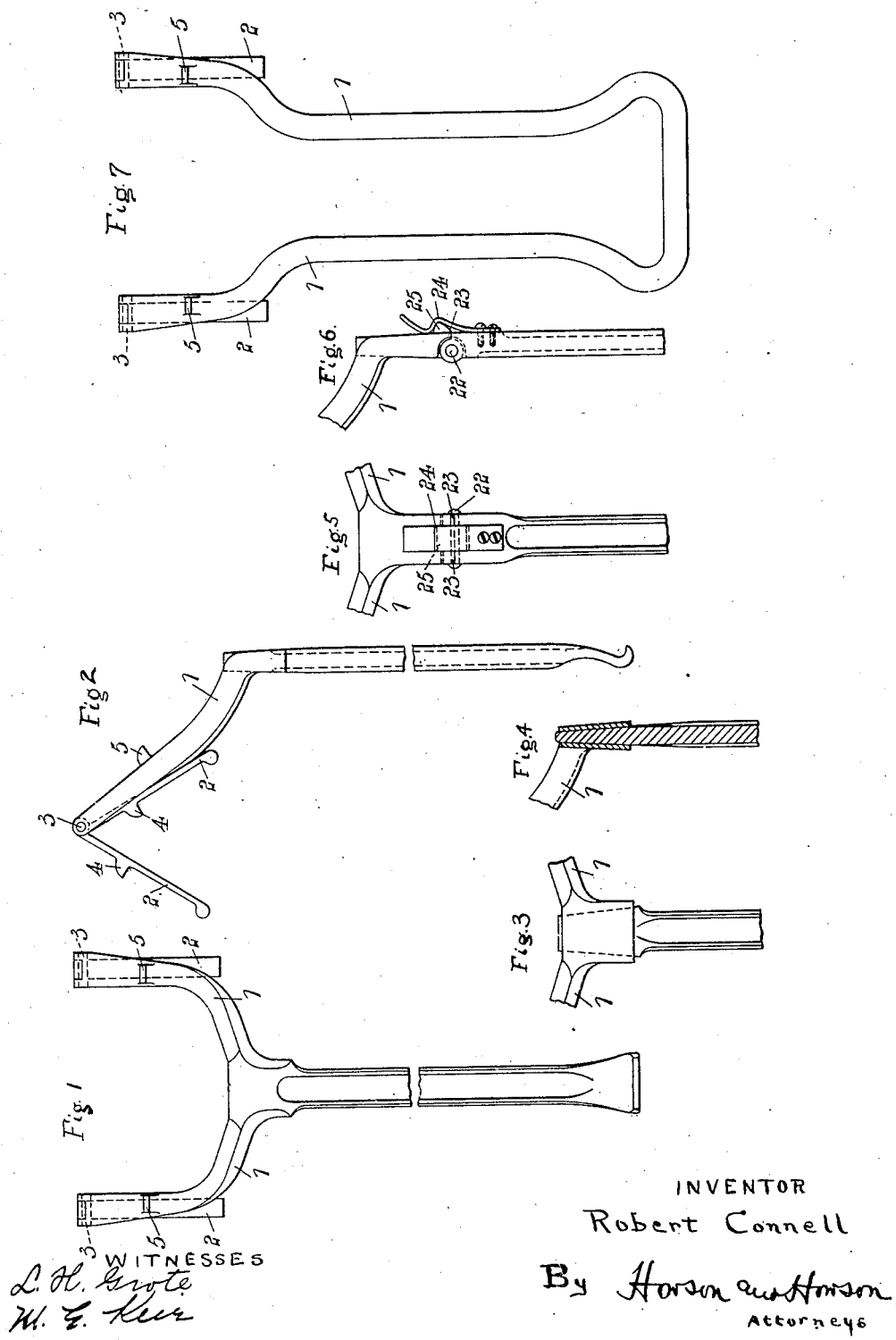

UNITED STATES PATENT OFFICE.

ROBERT CONNELL, OF GAINSBOROUGH, ENGLAND.

TIRE-SETTING TOOL.

No. 878,354. Specification of Letters Patent. Patented Feb. 4, 1908.

Application filed July 21, 1906. Serial No. 327,164.

*To all whom it may concern:*

Be it known that I, ROBERT CONNELL, a subject of the King of Great Britain and Ireland, residing at Highfield, Gainsborough, in the county of Lincoln, England, private secretary, have invented new and useful Improvements in Tire - Setting Tools, of which the following is a specification.

This invention relates to levers which are intended chiefly for use in raising and replacing the outer covers of pneumatic tires for the fixing and removal of the security studs and valves of such tires, but which are also applicable for use in lifting and replacing other sufficiently flexible tires. I will explain it as applied to a pneumatic tire cover.

Hitherto considerable inconvenience has been experienced in the insertion and removal of the security studs and valves, in, and from, the rims owing to the difficulty of safely and firmly holding the one edge of the outer cover of the pneumatic tire in the required elevated position and at the same time preventing the other edge of the cover from leaving its position in the rim and obstructing access to the security studs, or valves, or the openings in the rim through which they are passed.

The object of my invention to is obviate the said inconvenience and difficulty, which I do by providing a curved, forked, or double-armed, lever to the end of each prong, or arm, of which I hinge a small bar, or strut-piece. After the prongs, or arms, of the lever, with the said bars, or strut-pieces, folded against them, have been inserted between the one edge of the tire cover and the corresponding edge of the rim and the lever has been raised so as to cause projections, or recessed parts, on, or in, the prongs, or arms, to lift the said edge of the cover, the said small bars, or strut-pieces, will open out away from the prongs, or arms, of the lever, and act as struts between the side of the rim, in which the said edge of the tire cover is normally held, and the opposite edge of the tire cover, either the ends of the said prongs, or arms, or the ends of the strut-pieces themselves, bearing against the said opposite edge so as to retain the said opposite edge in position in the opposite edge of the rim and prevent the said edge of the cover from moving inwards while the lever is raised and the first named edge of the cover is also raised and moved back by the operation of the lever, so as to allow of unimpeded access to the inside of the tire cover and the security studs and valves and the openings therefor in the rim at the part where the tire cover is so raised and moved back.

I will describe, with reference to the accompanying drawings, constructions in accordance with my invention, premising that I do not limit myself to the precise details illustrated.

Figures 1 and 2 are views at right angles to each other, of a lever with the handle and prongs, or arms, in one with each other. Figs. 3 and 4 are like views of a modification in which the handle is made separately and is connected to the part carrying the prongs, or arms, by being passed into a socket therein. Figs. 5 and 6 are like views of a modification wherein the handle and the part carrying the prongs, or arms, are hinged together so that they may be folded on each other. Fig. 7 is a like view of a handle made rigid with the prongs, or arms, these parts being made from a rod, bent to the required shape. Figs. 8, 9 and 10 illustrate the use of the lever in raising and turning aside a portion of a pneumatic tire cover as hereinafter described. Figs. 11 to 20 illustrate various forms, or constructions, in connection with the strut - pieces, and Figs. 21 to 25 illustrate various forms, or constructions, in connection with the prongs, or arms, all as hereinafter described.

In all the figures corresponding parts are marked with like numerals of reference.

Referring first to Figs. 1 and 2, each of the prongs, or arms, 1 of the lever has a strut-piece 2, hinged, or jointed, to it at 3, each of the said strut-pieces having thereon a projection 4, for bearing against the inside edge of the rim. Each prong, or arm, 1 has also upon it a projection 5 to engage with the edge of the tire cover. The action of the device is illustrated in Figs. 8, 9 and 10. The prongs, or arms, 1, of the lever are introduced between the edge 6, of the rim and the edge 7, of the cover, as shown in Fig. 8, and, when the lever is raised, the projections 4, on the strut-pieces 2, bear against the turned-in edge 6, of the rim and the projections 5, on the prongs, or arms, 1, bear against the inside of the edge 7, of the tire cover, as shown in Fig. 9, and, by further elevation of the lever, the ends of the forks, or arms, 1, bear against the rim and the edge 8, of the tire cover and keep it in place against the other edge 9, of the rim while the tire cover is held up by the projections 5, on the prongs, or arms, 1, as shown in Fig. 10, and access to the interior of the tire cover and the security studs and valves and the openings for them in the rim at this part can be readily had.

Referring to Figs. 11 to 18, these show examples of ways in which the strut-pieces 2, and their projections 4, can be arranged. In Figs. 11 and 12, the projection 4, is hinged, by a pin 10, in an opening 11, in the strut-piece 2, so that it will fold back as the prongs, or arms, are being inserted. It can be provided with a spring 12, to return it to its projecting position, as shown in Fig. 11, or be without such spring, as shown in Fig. 12. Fig. 13 shows the projection 4, adjustable by being secured in position by a screw 13, which can be passed through different holes along the strut-piece 2. Fig. 14 shows the adjustment made by the projection 4, being slidable in a slot in the strut-piece 2, and being provided with a pin 14, which can be engaged with one, or the other, of bayonet-fastening slots in the strut-piece 15, and kept in position by a sliding spring sleeve 16. Fig. 15 shows how the prongs, or arms, may be jointed at a distance from the end of the strut-piece 2, so that the end 17, of the strut-piece will bear against the inner edge (as shown at 8, Figs. 8, 9 and 10) of the tire cover. Fig. 16 shows how the projection 4, can be formed by cranking the strut-piece. Figs. 17 and 18 show strut-pieces such as are shown in the main figures, but Fig. 17 shows how springs (18) can be arranged to cause the strut-pieces when released to take up their position against the prongs or arms of the lever. The outward extension of the strut-pieces with a projection to limit the movement of the prongs, or arms, when inserted under the tire-cover can be dispensed with, as shown in Figs. 20, 21. In Fig. 19 such a shortened strut-piece is shown made adjustable by a screwed connection 19. In Fig. 20 the shortened strut-piece is shown of simple non-adjustable form, Fig. 20 showing a spring 18 like that shown in Fig. 17.

Referring to the projections 5 on the prongs or arms, Figs. 21 and 22 show collapsible projections one in a recess in the prong, or arm, and one at the side of the prong, or arm, (or it may be at both sides) and each collapsible against a spring 20. Fig. 23 shows the projection adjustable and fixable by a screw 21, capable of being screwed into different holes in the prong, or arm. Fig. 24 shows a projection made by recessing the arm, or prong, and Fig. 25 shows a simple projection as in the main figures.

Although I have mentioned the connection between the strut-pieces and prongs, or arms, as being hinges it will be understood that they may be connected in any other manner so that they can be turned as upon a hinge when in use. For instance the pins which connect the prongs, or arms, and the strut-pieces may be engaged with slots on the latter so that after the strut pieces have taken up their position the prongs or arms can move forward relatively to the strut pieces and so give a better support for the raised part of the tire cover; or the connection may be made so that connected strut-pieces can be partly inserted first and then the prongs, or arms, be inserted so that they engage with pins or the like on the ends of such connected strut-pieces and the further operation then be as hereinbefore described.

Although I have shown the device as used with a pneumatic tire cover, it can of course be used with other tires which are sufficiently flexible to be dealt with after the same manner.

In Figs. 1, 2, and 7 the handle and prongs, or arms, are shown as being made in one piece. In Figs. 5 and 6 they are shown as being connected together by a hinge joint at 22, and with shoulders at 23, to take the strain so that the parts are rigid against strain in one direction while they can be folded upon each other in the other direction, a spring catch 24, on the one part, taking over a projection 25, on the other part when they are extended for use. In Figs. 3 and 4 one end of the handle part is housed in a socket in the part connecting the prongs, or arms, 1, and preferably made of flattened form, as shown, so that the handle part can be used as a simple prizing lever, of which two, or more, can be provided with each pair of prongs, or arms.

Having now particularly described and ascertained the nature of my said invention and in what manner the same is to be performed, I declare that what I claim is:—

1. A tire tool comprising a lever, a plurality of curved arms secured thereto, the ends of which are adapted to be inserted between the tire and the rim, means in connection with said arms for lifting the tire after their ends have been inserted, struts rotatably secured to the ends of the arms and means intermediate the ends of said struts for bracing the same against the rim after the ends of the arms carrying said struts have been inserted.

2. A tire tool comprising a lever, a plurality of curved arms secured thereto, the ends of which are adapted to be inserted between the ends of the tire and the rim, adjustable stops on said arms for lifting the tire after the ends of said arms have been inserted, struts rotatably secured to the ends of the arms and means intermediate the ends of said struts for bracing the same against the rim after the ends of the arms carrying said struts have been inserted.

3. A tire tool comprising a lever arm, one end of which is adapted to be inserted between the tire and the rim, a strut piece rotatably secured to said end of the lever arm, and means intermediate the ends of said strut for bracing the same against the rim after the end of the lever arm carrying said strut has been inserted.

4. A tire tool comprising a lever arm, one end of which is adapted to be inserted between the tire and the rim, a strut piece rotatably secured to said end of the lever arm, and a yielding stop intermediate the ends of said strut for bracing the same against the rim after the end of the lever arm carrying said strut has been inserted.

5. A tire tool comprising a lever arm, one end of which is adapted to be inserted between the tire and the rim, a strut piece rotatably secured to said end of the lever arm, and a spring actuated yielding stop intermediate the ends of said strut for bracing the same against the rim after the end of the lever arm carrying said strut has been inserted.

6. A tire tool comprising a curved lever arm provided with a stop, one end of said arm being adapted to be inserted between the tire and the rim, a strut piece rotatably secured to said end of the lever arm, and means intermediate the ends of said strut for bracing the same against the rim after the end of the lever arm carrying said strut has been inserted.

7. A tire tool comprising a curved lever arm provided with an adjustable stop, one end of said arm being adapted to be inserted between the tire and the rim, a strut piece rotatably secured to said end of the lever arm, and means intermediate the ends of said strut for bracing the same against the rim after the end of the lever arm carrying said strut has been inserted.

8. A tire tool comprising a lever, a forked extension pivoted at one end thereof, means for rendering said extension rigid against strain in one direction, in combination with strut pieces at the ends of the prongs of the fork and means intermediate the ends of said strut pieces for bracing the same against the rim after they have been inserted between the tire and the rim, substantially as described.

In testimony whereof I have signed this specification in the presence of two subscribing witnesses.

ROBERT CONNELL.

Witnesses:
HICKMAN B. BACON,
WILLIAM G. CONNELL.